Patented July 15, 1952

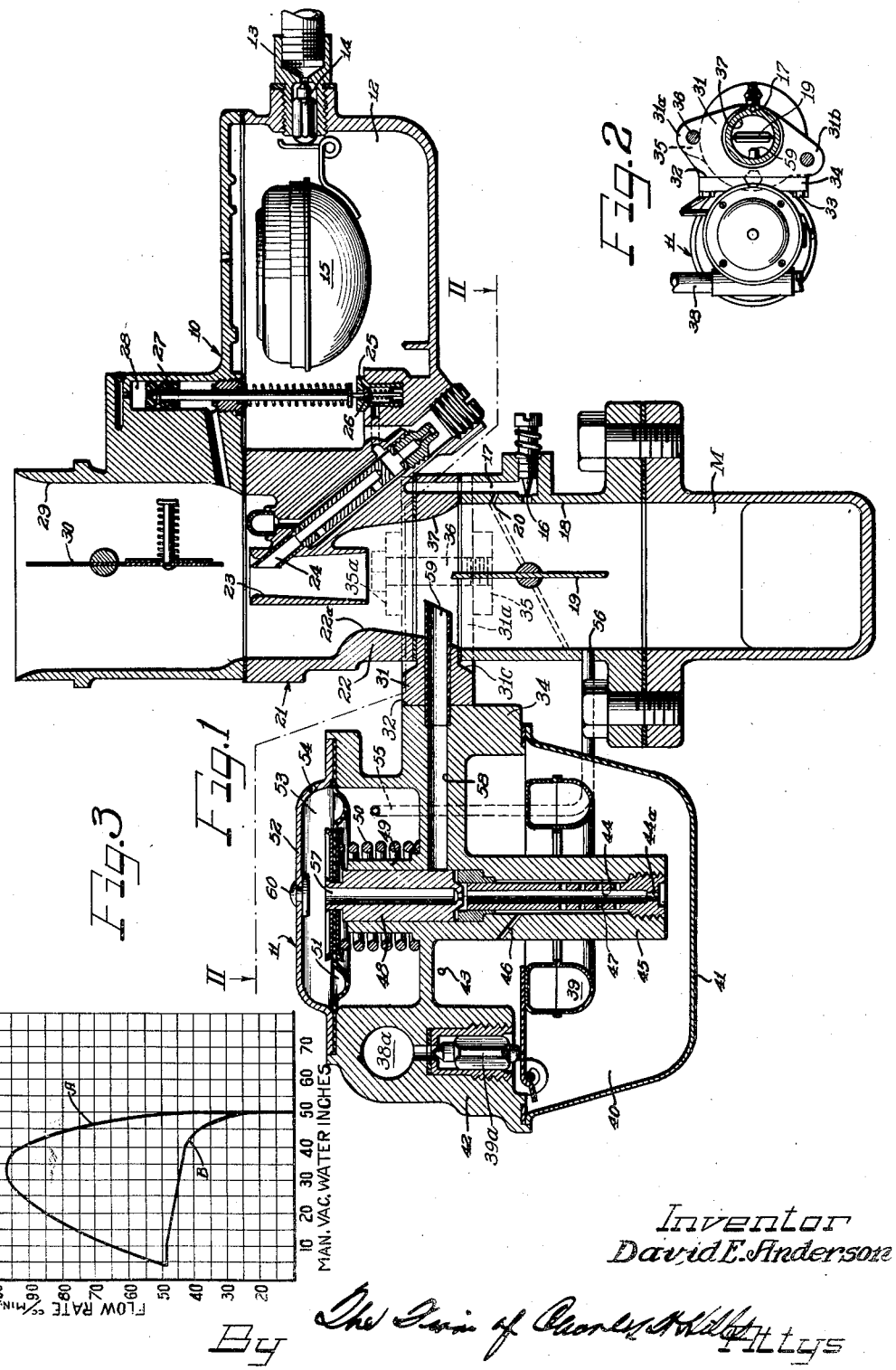

2,603,466

UNITED STATES PATENT OFFICE 2,603,466

MOUNTING FOR SUPPLEMENTARY FEED DEVICE FOR INTERNAL-COMBUSTION ENGINES

David E. Anderson, Shaker Heights, Ohio, assignor to Thompson Products, Inc., Cleveland, Ohio, a corporation of Ohio Application October 27, 1948, Serial No. 56,794

4 Claims. (Cl. 261—18)

This invention relates to a mounting for supplementary fuel feed devices for internal combustion engines and more particularly to a flange mounting arrangement for devices adapted for feeding metered amounts of coolant or anti-knock fluid to the fuel intake of internal combustion engines in accordance with varying engine requirements and in amounts closely correlated to such requirements.

Various types of devices for feeding supplementary fuels in metered amounts into the main fuel-air stream entering the engine and for controlling the flow of supplementary fuel in accordance with varying engine conditions have been proposed. In general, such devices attempt to control engine operation by the feeding of supplementary fuel in response to the varying manifold vacuum of the engine, since during those periods of high engine load, high speed and rapid deceleration, the manifold vacuum of the engine decreases.

The feeding devices of the prior art have been employed to inject supplementary fuel into the fuel-air combustion mixture flowing through that portion of the fuel inlet located between the throttle butterfly valve and the engine intake manifold. It has been found, although such devices are vented directly to the manifold pressure and are operative, that the rate of flow of supplementary fuel injected is not at all times in proportion to the manifold pressure and consequently, the supplementary fuel is not metered into the fuel stream exactly as required. For instance, a peak rate of flow of supplementary fuel is obtained at an intermediate manifold vacuum so that a greater amount of supplementary fuel is injected into the main fuel-air stream when the engine is operating under conditions not as conductive to pre-detonation and knock as at the lower manifold vacuum values where engine performance is generally very inefficient.

I have now found that it is possible to more nearly correlate the flow of supplementary fuel with the manifold vacuum and with the actual operating requirements of the engine by effecting the injection of supplementary fuel into the engine carburetor itself, while still controlling the flow by the manifold vacuum by means of a device vented to the intake manifold of the engine. As embodied in the present invention, supplementary fuel is injected into the main fuel-air stream as this stream issues from the exit mouth of the carburetor venturi. The main fuel-air stream flows from the carburetor venturi in amounts controlled by the throttle valve setting of the engine and the amount of supplementary fuel added to the fuel-air mixture is determined by the intake manifold vacuum.

By injection at this point the supplementary fuel is thoroughly mixed with the main fuel-air stream and the amount of supplementary fuel injected into the combustion chamber of the engine along with the main fuel-air combustion mixture is more nearly in accordance with the manifold vacuum in the operating conditions of the engine than is an amount injected in accordance with the teachings of the prior art. By the use of the device of the present invention mounted as herein disclosed, the maximum supplementary fuel flow takes place at the lowest engine vacuum, as is desired, and the flow rate decreases in proportion to the increase in manifold vacuum, or as the engine operates under conditions less likely to cause pre-detonation and knock.

According to the present invention, the supplementary fuel feeding device is mounted upon a separate mounting flange adapted to be removably secured to the carburetor between the Venturi block and the throttle body thereof, the mounting flange having a central, generally circular aperture for the flow of fuel and air therethrough, the aperture being contoured to define the outlet mouth of the carburetor venturi. Thus, the supplementary feed device is installed directly on the carburetor and supplementary fuel is discharged by means of the device into the main fuel-air mixture as it issues from the venturi in which the main fuel-air mixture is formed.

Accordingly, it is an important object of the present invention to provide a supplementary fuel feeding device for internal combustion engines for injecting supplementary fuel into the engine through a mounting block disposed in the carburetor of the engine to inject supplementary fuel into the main fuel-air mixture formed in the carburetor venturi.

It is a further important object of the present invention to provide a mounting flange for mounting a supplementary fuel feed device upon the carburetor of an internal combustion engine, the mounting flange fitting between the Venturi block and the throttle body of the carburetor and having a central aperture contoured to form a continuation of the carburetor venturi, said device having a nozzle extending into the aperture for the injection of supplementary fuel into the engine in accordance with the operating conditions of the engine.

A further object of the present invention is to provide a supplementary fuel feeding device for internal combustion engines to inject supplementary fuel into the main fuel-air mixture formed in the carburetor venturi as the main fuel-air mixture issues from the Venturi outlet mouth in order to thoroughly admix the supplementary fuel, main fuel and air for subsequently introduction into the combustion chambers of the engine.

It is still a further important object of the present invention to provide a mounting flange for attaching a supplementary fuel feeding device to the carburetor of an internal combustion engine to inject supplementary fuel into the main fuel-air stream as it issues from the venturi of the carburetor for thorough admixture with the main fuel-air combustion mixture consequently introduced into the combustion chambers of the engine.

On the drawings:

Figure 1 is a vertical cross-section view, with parts shown in elevation, of a supplementary fuel feed device mounted on the carburetor of an internal combustion engine in accordance with the present invention;

Figure 2 is a cross-section view, with parts shown in elevation, taken along the plane II—II of Figure 1; and Figure 3 is a chart of supplementary fuel feed curves illustrating the feeding characteristics of the supplementary fuel feeding device mounted in accordance with the present invention as contrasted with the feeding characteristics of a similar device mounted as in the prior art.

As shown on the drawings:

In Figure 1, reference numeral 10 refers generally to a carburetor of an internal combustion engine and reference numeral 11 refers generally to a metering device for injecting supplementary cooling or anti-knock fluid into the engine.

As particularly shown in Figure 2, carburetor 10 has a housing defining a float chamber 12 connected to a main fuel supply through nipple 13, the flow of main fuel into the chamber 12 being regulated by a valve 14 controlled by float 15 disposed in the float chamber 12. Chamber 12 is connected to idling fuel jet 16 by a passage 17, the jet 16 opening into the throttle body 18 of the carburetor at a point beyond the throttle butterfly valve 19. The throttle body 18 is secured to the engine intake manifold M to supply a fuel charge thereto. A low speed fuel jet 20 also joins passage 17 through the passage in throttle body 18 and is adapted to be closed when the throttle butterfly valve 19 is closed and the engine is idling.

Carburetor 10 is provided with Venturi block 21 defining a main venturi 22 having a throat portion 22a and an auxiliary venturi 23 having a high speed fuel jet 24 for injecting fuel from float chamber 12 into the auxiliary venturi 23 when the engine is operated at high speeds.

Carburetor 10 is also provided with a by-pass power jet 25 controlled by a spring urged valve 26 and a piston 27 operating in a chamber 28 vented to manifold pressure on one side of the piston and to air pressure in air inlet chamber 29 on the other side of the piston. Choke valve 30 controls the flow of air through the air inlet chamber 29.

As shown in Figure 1, supplementary fuel device 11 is mounted on the carburetor 10 by means of a mounting flange or insert body 31 formed with protruding ear portions 31a and 31b as best shown in Figure 2. The flange is recessed as at 31c to receive on its opposite faces the annular mating faces of Venturi block 21 and throttle body 18. The ear portions 31a and 31b are adapted to extend on either side of the throttle body 18 and Venturi block 21, and the flange 31 is provided with a flat face 32. The feeding device 11 is mounted on the mounting flange 31 by suitable means, such as screws 33 passing through a mounting flange 34 provided on the device 11 and threadedly retained within the mounting flange 31. The Venturi block 21 and the throttle body 18 are each provided with protruding ears, such as the ears 35 on the throttle body, and ears 35a on the Venturi block as shown in dotted outline in Figure 2, the ears being normally provided to secure the Venturi block to the throttle body and being utilized in the present invention to secure the mounting block 31 in position therebetween. The mounting flange 31 is adapted to lie between the Venturi block 21 and the throttle body 18 as shown in Figure 1 and is maintained in position therebetween by suitable means, such as by bolts 36 (Figure 2) and shown in dotted outline in Figure 1 as passing through the registering apertures in ears 35a of Venturi block 21 and ear portions 31a and 31b of mounting flange 31, the bolts being threadedly retained in ears 35 of throttle body 18. The mounting flange 31 is centrally apertured as at 37, the aperture 37 registering with the main venturi 25 and the aperture of throttle body 18. The aperture 37 of the mounting flange 31 is contoured to form a continuation of the main venturi 22 and defines the outlet mouth of the venturi. The mounting flange 31 thus provides a readily accessible, easily removable means for securing the feeding device 11 in a position adjacent the mouth of the venturi 22, with the flange being interposed between the Venturi block 21 and the throttle body 18, the aperture 37 being contoured to form the exit mouth of the venturi 22.

As shown in Figure 2, supplementary fuel is fed to the feeding device 11 through a feed line 38 connected to a source of supplementary fuel, such as a mixture of alcohol and water, contained in a suitable receptacle (not shown). A suitable supplementary fuel is composed of 85% by weight methanol, 15% by weight water and 3 cc. per gallon tetraethyl lead.

The supplementary feeding device shown in Figure 1 includes a float 39 mounted in a float chamber 40 defined by bottom cup or bowl 41 and an upper casing 42, the float 39 controlling an inlet valve 39a receiving fluid from a passage 38a connected to feed line 38. The float chamber 40 is vented to atmosphere as at 43, and fuel from the float chamber 40 flows through fixed orifice 44a formed in the bottom of a tube 44 which is mounted in a depending boss 45 on the casing 42. The tube 44 is vented to atmosphere and float chamber 40 by a vent 46 in boss 45, and the passage through the tube is vented through holes 47 in the tube.

The flow of fluid through the tube 44 is controlled by a diaphragm and spring urged valve 48. The valve 48 is guided by an upstanding portion 49 of boss 45, the valve being urged upwardly by spring 50 against the action of a diaphragm 51 secured in position by a cover plate 52 defining with the diaphragm 51 a chamber 53 vented to atmospheric pressure at 54. The under surface of the diaphragm 51 is subjected to manifold vacuum through tube 55 extending from the casing 42 into the throttle body 18 at 56 below throttle butterfly valve 19. Valve 48 is provided with an axial bore 57 and, when valve 48 is lifted from seated position, fluid from the float chamber 40 may flow through the tube 44 into passage 58 formed in the casing 42 and the mounting flange 31. A nozzle 59 is fitted into the passage 58 and extends through mounting flange 31 in full communication with the passage 58. The nozzle 59 extends into aperture 37 of flange 31 defining the outlet mouth of the main venturi 22 and is disposed directly beneath the auxiliary venturi 23.

It will readily be seen that the diaphragm 51, exposed on its upper surface to atmospheric pressure of chamber 53 and exposed on its under surface to intake manifold pressure through tube 55, provides a ready means for controlling, through the valve 48, the flow of supplementary fluid from the float chamber 40 into the exit mouth of venturi 22. When the engine is operating under idling conditions, the vacuum in the intake manifold and on the under surface of the diaphragm 51 will be sufficiently large to cause the diaphragm 51 to move downwardly, moving the valve 48 to shut off flow of fluid from passage 44 to passage 58. Therefore, at idling speed or conditions of high vacuum, where engine detonation or knock would not be encountered and auxiliary fuel is not required, the supplementary feeding device 11 completely shuts off the flow of supplementary fuel to the engine.

However, when the engine is operating under conditions of high load, rapid acceleration or high speed, the engine vacuum will be low, and the vacuum against the under surface of diaphragm 51 will be decreased so that the spring 50 will lift valve 48 to establish flow of supplementary fuel and air through the tube 44, the passage 58 and the mouth 59 for introduction into the carburetor venturi 25 adjacent the outlet mouth thereof. If the decrease in manifold vacuum is not great enough to move the valve 48 sufficiently high to bring the upper surface of the valve into contact with a button 60 provided in the closure cap 52, additional air from air chamber 53 may flow through the bore 57 of valve 48 for admixture with supplementary fuel flowing through the passages 44 and 58. This admixture of air with supplementary fuel increases the economy of operating the engine and further aids in guaranteeing the presence of a sufficient quantity of air in the mixture of main fuel and air to be subsequently ignited in the combustion chambers of the engine.

When the engine is operating under a manifold vacuum sufficiently low that spring 50 lifts the valve 48 into contact with button 60, the stream of air flowing through the bore 57 for admixture with the supplementary fuel will be stopped and supplementary fuel admixed only with air from the holes 47 will be fed to the nozzle 59 into the carburetor venturi for admixture with the main fuel flowing therethrough. Under these conditions of extremely low manifold vacuum, a rich supplementary fuel mixture is required to more effectively prevent engine detonation and knocking.

By the mounting arrangement of the present invention, supplementary fuel in precisely metered quantities and with proper amounts of air is intimately mixed in the carburetor venturi in the discharge mouth thereof with the mixture of air and main fuel formed therein. The mixture of air and fuel when the engine is operating at low manifold vacuum is formed primarily in the auxiliary venturi 23 and the supplementary fuel is introduced by means of the mounting herein provided at a point spaced below the auxiliary venturi, taking advantage of the turbulence created within both the auxiliary venturi 23 and the main venturi 22. The turbulence created by the fuel mixture discharge at the Venturi outlet thus aids in insuring an even dispersion of supplementary fuel in the mixture of main fuel and air subsequently introduced into the combustion chambers of the engine.

The mounting of a supplementary fuel feed device as herein provided makes possible a substantial savings in the amount of supplementary fuel injected into the engine. This saving is illustrated in the chart of Figure 3 of the drawings in which curve A represents the flow rate of auxiliary fuel actually fed into the main fuel-air mixture while employing a device such as hereinbefore described in accordance with the teachings of the prior art in which introduction of supplementary fuel takes place in the intake manifold beyond the butterfly throttle valve 19. In curve A, the maximum flow rate is obtained at a manifold vacuum of approximately 32.5 inches of water, even though the maximum amount of supplementary fuel is needed at much lower vacuums to prevent engine detonation and knock. Curve B represents the flow rate of supplementary fuel from a device mounted in accordance with the present invention for the injection of supplementary fuel at the Venturi outlet of the carburetor. The flow rate curve B, as compared with curve A, clearly illustrates the substantial saving of suplementary fuel made possible by the employment of the device mounted as herein described. In curve B, maximum flow rate is obtained at a manifold vacuum of less than 10 inches, or at those manifold vacuums at which supplementary fuel is actually needed. Curve B shows a diminishing of the flow rate when the manifold vacuum increases and as the possibility of engine detonation and knock decreases. That amount of supplementary fuel injected by the prior art devices at higher vacuums in excess of that injected at very low vacuums is largely wasted. These curves show a saving of supplementary fuel amounting to 53 cc. per minute at a manifold vacuum value of approximately 32.5. The advantages residing in the present invention in the substantial savings of supplementary fuel and in the closer correlation of the feed rate of supplemental fuel with the manifold vacuum will be evident to those skilled in the art.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. The combination with a carburetor for an internal combustion engine having a Venturi block defining an interior Venturi throat and a throttle valve-equipped throttle body for receiving a combustible main fuel-air mixture from said Venturi block, of a mounting flange inserted between said Venturi block and said throttle body and having an aperture therein with walls contoured to form a discharge mouth for the Venturi throat of said block, means for securing said flange between said block and said body, a device for feeding supplementary fuel to said carburetor in accordance with the manifold vacuum of the engine fed by the carburetor, means for securing said device to the flange, and a nozzle communicating with said device and projecting into the aperture of said flange for introducing supplementary fuel into the Venturi exit mouth defined by said flange aperture.

2. The combination with a carburetor having a Venturi block defining an interior Venturi throat and a throttle body centrally apertured to receive a fuel-air mixture from the block, the block and the throttle body each carrying apertured ears for receiving bolt means securing the block and body in assembled relation forming the complete carburetor, of a mounting flange interposed between said Venturi block and said throttle body and having a central aperture formed therein, ears formed on said flange having apertures registering with those of said ears on said block and said body, bolt means inserted in said apertures to maintain said flange in position between said block and said body with the flange aperture in alignment with said Venturi throat and the aperture of the throttle body with that portion of said flange defining said aperture having arcuate inner peripheral walls forming an enlarged exit throat for said venturi, a device for feeding supplementary fuel to said carburetor in accordance with the manifold vacuum of the engine fed by said carburetor, and a nozzle communicating with said device and projecting into the aperture of said flange for introducing supplementary fuel into the aperture ahead of said throttle body.

3. Means for controlling the flow rate of supplementary fuel into a carburetor mounted on an internal combustion engine and having a Venturi block defining an interior Venturi throat and a throttle valve-equipped throttle body for receiving a combustible main fuel and air mixture from said Venturi block and serving to introduce the mixture into the intake manifold of the engine, comprising a mounting flange inserted between the said Venturi block and said throttle body and having an aperture therein with peripheral walls contoured to blend with the internal contour of said venturi, thereby forming a discharge mouth beyond the Venturi throat of said block, bolt means for securing said flange between said block and said body, a supplementary fuel feeding device having a chamber for containing a body of supplementary fuel and secured to said mounting flange, a conduit leading from said chamber to the discharge mouth defined by said flange aperture, and a vacuum operated valve positioned in said conduit and responsive to engine manifold vacuums for controlling the flow rate of supplementary fuel from said chamber into said throat in accordance with manifold vacuum, with the maximum flow of supplementary fuel occurring at minimum manifold vacuum.

4. In a carburetor for an internal combustion engine, a Venturi block having a flow opening therethrough extending from an inlet side thereof to an outlet side thereof and converging in the direction of flow to an intermediate throat portion of reduced cross-sectional area and diverging from the throat portion to the outlet side, means on said block for injecting main fuel into said flow opening, a mounting flange secured to the outlet side of the main Venturi block and having a flow aperture therethrough diverging in the direction of flow and forming a smooth continuation of the diverging portion of the main Venturi block opening, a supplementary fuel device secured to said mounting flange, and a supplementary fuel nozzle communicating with said device and extending into said flange aperture into a region of maximum fuel-air turbulence.

DAVID E. ANDERSON.

REFERENCES CITED

The following references are of record in the file of this patent:

UNITED STATES PATENTS

| Number | Name | Date |
| --- | --- | --- |
| 1,929,266 | Viel | Oct. 3, 1933 |
| 2,042,770 | Chandler | June 2, 1936 |
| 2,212,946 | Mock et al. | Aug. 27, 1940 |
| 2,252,415 | Schwarz | Aug. 12, 1941 |
| 2,321,211 | Johnson | June 8, 1943 |
| 2,441,301 | Waag et al. | May 11, 1948 |
| 2,458,256 | Crozier | Jan. 4, 1949 |